US010351481B2

(12) United States Patent
Goodwin et al.

(10) Patent No.: US 10,351,481 B2
(45) Date of Patent: Jul. 16, 2019

(54) POTASSIUM-BASED STARTER FERTILIZER

(71) Applicant: Compass Minerals Manitoba, Inc., Winnipeg (CA)

(72) Inventors: Mark Goodwin, Winnipeg (CA); Reanne Pernerowski, Winnipeg (CA)

(73) Assignee: Compass Minerals Manitoba Inc., Winnipeg, Manitoba (CA)

( * ) Notice: Subject to any disclaimer, the term of this patent is extended or adjusted under 35 U.S.C. 154(b) by 0 days.

(21) Appl. No.: 15/064,752

(22) Filed: Mar. 9, 2016

(65) Prior Publication Data
US 2017/0057881 A1    Mar. 2, 2017

Related U.S. Application Data

(60) Provisional application No. 62/130,987, filed on Mar. 10, 2015.

(51) Int. Cl.
| | |
|---|---|
| *C05D 1/00* | (2006.01) |
| *C05C 9/00* | (2006.01) |
| *C05D 1/02* | (2006.01) |
| *C05B 17/00* | (2006.01) |
| *C05G 3/06* | (2006.01) |

(52) U.S. Cl.
CPC ............... *C05D 1/00* (2013.01); *C05B 17/00* (2013.01); *C05C 9/005* (2013.01); *C05D 1/02* (2013.01); *C05G 3/06* (2013.01)

(58) Field of Classification Search
CPC .... C05D 1/00; C05D 1/02; C05G 3/06; C05C 9/005; C05B 17/00
See application file for complete search history.

(56) References Cited

U.S. PATENT DOCUMENTS

| | | | |
|---|---|---|---|
| 5,451,242 A | * | 9/1995 | Ming ..................... C05B 17/00 423/311 |
| 6,874,277 B2 | | 4/2005 | Yamashita |
| 7,445,657 B2 | | 11/2008 | Green |
| 8,216,337 B2 | * | 7/2012 | Varadachari ............ C05B 13/04 71/42 |
| 8,221,515 B2 | | 7/2012 | Goodwin |
| 8,685,134 B2 | | 4/2014 | Goodwin |

(Continued)

FOREIGN PATENT DOCUMENTS

| | | | |
|---|---|---|---|
| CN | 101423431 | 5/2009 | |
| CN | 101468931 A | * 7/2009 | ............... C05G 1/06 |

(Continued)

OTHER PUBLICATIONS

Allman, Molly. "The Effect of Excess Iron in Plants". SF Gate Home Guides. pp. 1-2 (Jul. 2014) <http://homeguides.sfgate.com/effect-excess-iron-plants-48927.html>.*

(Continued)

*Primary Examiner* — Jennifer A Smith
(74) *Attorney, Agent, or Firm* — Hovey Williams LLP (57) ABSTRACT

The coatings of the invention provide potassium in a readily available form in combination with other nutrients that promote early plant growth and health. The potassium-based fertilizer product which comprises: potassium, zinc, manganese and iron. Calcium may also be added. The mixture is applied in a 325 MESH or finer powder to suitable agronomic carriers.

51 Claims, 9 Drawing Sheets

(56) References Cited

U.S. PATENT DOCUMENTS

| | | | |
|---|---|---|---|
| 8,951,327 B2* | 2/2015 | Shah | C05D 9/02 |
| | | | 71/63 |
| 9,187,380 B2 | 11/2015 | Goodwin et al. | |
| 2004/0237615 A1* | 12/2004 | Green | A01C 1/06 |
| | | | 71/28 |
| 2012/0325421 A1* | 12/2012 | Li | C05F 7/02 |
| | | | 162/189 |
| 2013/0005578 A1* | 1/2013 | Bergstrom | A01N 25/24 |
| | | | 504/358 |

FOREIGN PATENT DOCUMENTS

| | | |
|---|---|---|
| CN | 101747102 | 6/2010 |
| EP | 2603473 | 6/2013 |
| WO | 2012/020427 | 2/2012 |
| WO | 2014/016751 | 1/2014 |

OTHER PUBLICATIONS

Kuepper, George. "Foliar fertilization." NCAT Agriculture Specialist. ATTRA Publication# CT13 (2003).*
International Search Report dated Jun. 10, 2016 in corresponding PCT/CA2016/050261 filed Mar. 10, 2016, 3 pages.
English Abstract of CN101423431, 1 page.
English Abstract of CN101747102, 2 pages.

* cited by examiner

POTASSIUM-BASED STARTER FERTILIZER

CROSS-REFERENCE TO RELATED APPLICATIONS

This application claims priority under 35 U.S.C. § 119 to provisional application Ser. No. 62/130,987, filed Mar. 10, 2015, herein incorporated by reference in its entirety.

FIELD OF THE INVENTION

The present invention relates generally to the field of fertilizers.

BACKGROUND OF THE INVENTION

Carbon, hydrogen, oxygen, nitrogen, phosphorus and sulphur are the primary elements essential to all life. Soils contain all of these elements in addition to other macronutrients and micronutrients which are needed for plant growth. Typically, such elements are not present in the soil in sufficient quantity or in forms that can support maximum plant growth and yield. In order to overcome these deficiencies, fertilizers having specific chemical constituents in specific amounts are often added to the soil, thereby enriching the growth medium. The fertilizers may be supplemented with certain trace elements such as copper, iron, manganese, zinc, cobalt, molybdenum, and boron, as oxides or salts containing the elements in the cationic form.

Agriculturally, metal ions are essential nutrients for plant growth. Soil deficiency because of the unavailability or exhaustion of metal ions is very often the cause of poor plant growth.

Acidification of soil may be needed when soil pH is high or when naturally occurring calcium carbonates are present. For example, when pH is above about 7.5, the solubility of phosphorous and the metal micronutrients such as iron, manganese and zinc are limited. Thus, generating a zone of acidification where the solubility of the fertilizers is enhanced promotes plant growth by increasing nutrient availability.

SUMMARY OF THE INVENTION

According to a first aspect of the invention, there is provided a fertilizer coating comprising:
about 30 to about 40% source of potassium (w/w);
about 17 to about 20% source of zinc (w/w);
about 4 to about 5% source of manganese (w/w);
about 0.1 to about 0.9% (w/w) source of iron; and
0 to about 3% (w/w) source of calcium.

According to a second aspect of the invention, there is provided an agronomic carrier coated with the fertilizer coating as described above.

According to a third aspect of the invention, there is provided a method of promoting early plant growth comprising:
providing a planted seed or seedling with a coated agronomic carrier, the coating comprising:
about 30 to about 40% source of potassium (w/w);
about 17 to about 20% source of zinc (w/w);
about 4 to about 5% source of manganese (w/w);
about 0.1 to about 0.9% source of iron; and
0 to about 3% source of calcium; and
allowing the seed or seedling to grow under suitable growth conditions.

According to fourth aspect of the invention, there is provided a method of promoting early plant growth comprising:
providing a seed coated with a coating comprising:
about 30 to about 40% source of potassium (w/w);
about 17 to about 20% source of zinc (w/w);
about 4 to about 5% source of manganese (w/w);
about 0.1 to about 0.9% source of iron; and
0 to about 3% source of calcium; and
allowing the seed to grow under suitable growth conditions

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

The present invention relates to a delivery technique that provides early season benefits from potassium nutrition in combination with certain other key nutrients that are also critical to early season growth. This invention has utility for applications in situations where there is an incremental benefit to adding potassium in a manner that matches the early season potassium flux requirements of crops plants better than traditional granules.

As used herein, "agronomic carrier" refers to an agricultural product, for example, but by no means limited to seeds; fertilizer products; urea prills; granular fertilizer products; and inert or biodegradable pellets.

Previous researchers have found crop plants need very rapid potassium ion flux into roots during the initial two weeks of growth and that potassium ion flux into roots during the first 14 days after emergence needs to be 4 to $23 \times 10^{-12}$ moles per cm root per second. Thereafter it falls to 2 to $5 \times 10^{-12}$ moles per cm root per second. Currently available technologies do not optimize potassium nutrition in a manner that meets this requirement. Specifically, as demonstrated in the examples and as discussed below, the coatings of the invention provide potassium in a readily available form in combination with other nutrients that promote early plant growth and health.

Described herein is a potassium-based fertilizer product which comprises:

i) a source of potassium, for example, sulfate of potash (SOP) or potassium chloride (KCl)— ii) a source of zinc, for example, zinc sulfate ($ZnSO_4$) or Zinc oxide (ZnO);

iii) a source of manganese for example manganese chloride ($MnCl_2$) or manganese sulfate ($MnSO_4$); and iv) a source of iron for example, iron sulfate ($FeSO_4$) or iron oxide (FeO).

Optionally, in some embodiments, a source of calcium, for example, calcium sulfate ($CaSO_4$) or calcium oxide (CaO) may be added, as discussed below.

As will be appreciated by one of skill in the art, other suitable sources of potassium, zinc, manganese and iron may be used with the invention and are within the scope of the invention.

While not wishing to be bound to a particular theory or hypothesis, the inventor believes that the combination of nutrients described above promotes plant growth in a synergistic manner. Specifically, as shown in the examples below, the zinc and iron sources accelerate root length which provides more root surface area for uptake of the potassium ions, that is, the potassium source, by the roots. Furthermore, the manganese source improves plant tolerance to a number of root diseases.

While not wishing to be bound to a particular theory or hypothesis, it is believed that calcium bolstered consistency of performance of the fertilizer coating. This is based on existing knowledge of elemental interactions found in soil and noted by soil scientists. For example, as noted in Karnataka J. Agric. Sci., 24 (1): (106-109) 2011, there is a complicated relationships between nutrients. However, it is known that optimal levels of calcium and zinc may improve uptake of phosphorus and potassium.

As discussed below, the addition of boron hindered corn growth but promoted growth in soybeans. While not wishing to be bound to a particular theory or hypothesis, it is noted that the reason the added boron helped in the case of soybeans but hindered corn growth may have been due to rate response issues.

In some embodiments, the product includes an acidifying agent for example a low molecular weight acid such as for example but by no means limited to citrate or ascorbic acid or a high molecular weight organic acids for example but by no means limited to fulvic acid or humic acid.

While not wishing to be bound to a particular theory or hypothesis, the inventor believes that the presence of the acidifying agent prevents the zinc and manganese from forming complexes in the soil which cannot be taken up readily by the plants.

In yet other embodiments, the product includes a sticking agent such as an alkylnaphthalene sulfonate surfactant (MORWET®), in order to optimize adherence of the nutrients to agronomic carriers such as fertilizer granules or prills or seed.

The coating is ground to a 325 mesh or finer powder prior to application to the agronomic carrier. As will be appreciated by one of skill in the art, the individual components of the coating may be ground prior to mixing or may be ground during mixing or may be ground post-mixing. In addition, some components may be mixed together and ground to a 325 mesh or finer powder prior to being combined with other components of the coating.

The coating may be applied to the agronomic carrier at 0.25-2.0% (w/w).

In some embodiments, the coating comprises:
at least about 36% source of potassium (w/w);
about 17 to about 20% source of zinc (w/w);
about 4 to about 5% source of manganese (w/w);
about 0.1 to about 0.9% source of iron; and
0 to about 3% source of calcium.

In other embodiments, the coating comprises:
about 30 to about 40% source of potassium (w/w);
about 17 to about 20% source of zinc (w/w);
about 4 to about 5% source of manganese (w/w);
about 0.1 to about 0.9% source of iron; and
0 to about 3% source of calcium.

In some embodiments, a suitable organic acid and a formulating agent may be added.

As will be appreciated by one of skill in the art, different organic acids may be used in accordance with the plant type and soil condition for which the product is to be used. Such acidifying agents can be readily determined by one of skill in the art, given the examples provided above and routine experimentation.

Similarly, a suitable formulating agent may be selected based on the nature of the carrier to which the product is to be adhered. Such formulating agents can be readily determined by one of skill in the art, given the examples provided above and routine experimentation.

Potassium is routinely used in fertilizer programs as one of the three largest crop-requirement nutrients. Several hundred pounds per acre of potassium are often required for crops to grow. Crops use the nutrient for early growth and for other biological roles such as water regulation.

This invention allows growers to achieve the same early growth benefits with amounts of potassium that are 1 to 2 percent of typical rates, especially with respect to, but not limited to, root growth. As discussed herein, it has been discovered through experiments that tested combinations of nutrients that potassium can provide excellent early crop benefits when (a) the potassium is finely ground in order to optimize uptake; (b) when the specific form of potassium that is used is either the sulphate or chloride form; and (c) when that potassium is combined with certain micronutrients that are also in finely divided form. These benefits equal or even exceed those achieved with traditional potassium application rates that are many times the application rate of the invention, as discussed above.

According to another embodiment of the invention, there is provided a method of promoting early plant growth comprising:

providing a planted seed or seedling with a coated agronomic carrier, the coating comprising:
about 30 to about 40% source of potassium (w/w);
about 17 to about 20% source of zinc (w/w);
about 4 to about 5% source of manganese (w/w);
about 0.1 to about 0.9% source of iron; and
0 to about 3% source of calcium; and allowing the seed or seedling to grow under suitable growth conditions.

As will be apparent to one of skill in the art, the seed or seedling will show greater or improved early growth compared to more to a similar seed or seedling supplied an uncoated agronomic carrier.

As discussed herein, the improved early plant growth may comprise one or more of greater root length, more individual roots, denser root structure, greater shoot growth and the like. Other suitable markers of increased or enhanced early plant growth will be readily apparent to one of skill in the art.

As will be appreciated by one of the skill in the art, the coated agronomic carrier may be co-administered with the seed or seedling or may be applied to the soil in which the seed or seedling is planted either prior to or post planting.

According to another embodiment of the invention, there is provided a method of promoting early plant growth comprising:

providing a seed coated with a coating comprising:
about 30 to about 40% source of potassium (w/w);
about 17 to about 20% source of zinc (w/w);
about 4 to about 5% source of manganese (w/w);
about 0.1 to about 0.9% source of iron; and
0 to about 3% source of calcium; and
allowing the seed to grow under suitable growth conditions.

As will be apparent to one of skill in the art, the seed or seedling will show greater or improved early growth compared to more to a similar seed or seedling supplied an uncoated agronomic carrier.

Initial testing with K alone coated onto urea showed that there was no benefit. In fact, initial testing showed an actual decline in early growth. See FIG. 1.

We found however that we obtained dramatically different and positive results when the potassium was presented in a mixture with other specific nutrients and (a) admixed with the nutrients such that the K source was 30-40% of a specific mix and was made up of either KCl or SOP, (b) the other components of the mix consist of a combination containing a base component consisting of 21 to 30% Zn sources plus 14 to 25% Mn sources and 0 to 25 percent Calcium/Boron/Iron and (c) the mixture was applied in a 325 mesh or finer powder and (d) a small amount of acidifier and sticking agent was applied with 4 grams per 100 grams of organic acid (citrate), 3 grams per 100 of surfactant and 3 grams per 100 grams of sucrose.

Figure 2:
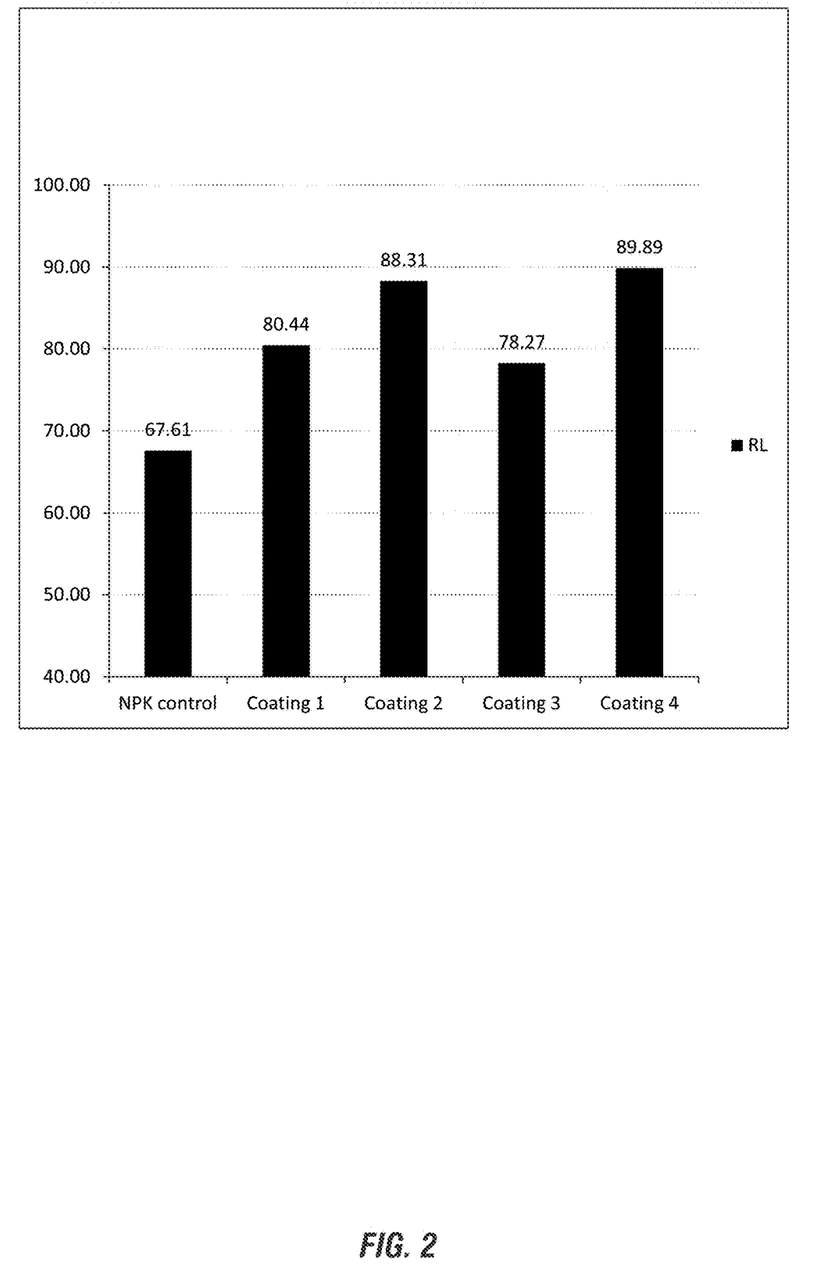
FIG. 2 is a bar graph showing the effect of each of the different coatings described in the examples coated on a NPK prill on root length in centimeters in recently emerged corn.

The mixing grid/ratios we used to test this is as follows, with quantities listed given as % actual element (Table 1)

straight potassium approach, positive. FIG. 2 shows that corn seeded into soil where the N and P were coated with one of four candidate coatings (as listed in Table 1) gave 16 to 33 percent more root growth than the control (which had many times the potassium rate as the coatings)

As can be seen in Table 1, coating 1 comprises 23% potassium, 20% zinc, 5% manganese and 0.1% iron.

Coating 2 comprises 20.7% potassium, 18% zinc, 4.5% manganese, 2.7% calcium and 0.1% iron.

Thus, coating 2 differs from coating 1 in that it has less potassium, zinc and manganese but includes calcium.

Coating 3 comprises 19.7% potassium, 17.1% zinc, 4.28% manganese, 1.35% calcium, 1.48% boron and 0.94% iron.

Thus, compared to coating 1, coating 3 has less potassium, zinc and manganese but has more iron and includes calcium and boron.

Compared to coating 2, coating 3 has less potassium, less zinc, less manganese, less calcium but more iron and includes boron.

As can be seen, while the amounts of potassium, zinc and manganese differ in each of these three coatings, the differences are not significant.

Coating 4 comprises 26% potassium, 8.25% manganese and 11.75% iron but has no zinc, calcium or boron.

Compared to coating 1, coating 4 has more potassium and manganese and significantly more iron but has no zinc.

Compared to coating 2, coating 4 has more potassium and manganese and significantly more iron but has no zinc or calcium Compared to coating 3, coating 4 has more potassium, more manganese and significantly more iron but no zinc, calcium or boron.

In the accompanying figures, plants were grown in a growth room at room temperature and then harvested 10 days after emergence.

Figure 1:
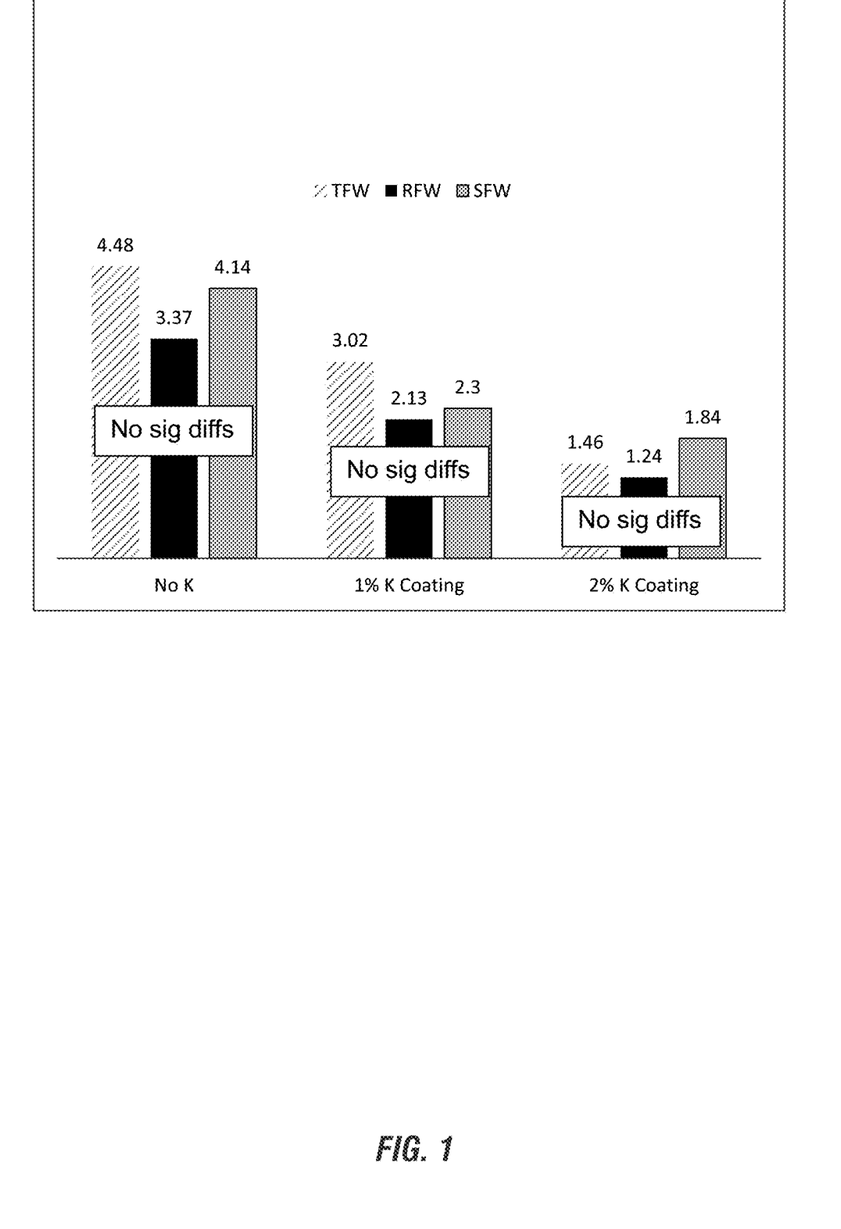
FIG. 1 is a bar graph showing the effect of differing amounts of powdered potassium coated onto a urea prill on total fresh weight, root fresh weight and shoot fresh weight in grams of recently emerged corn.

Referring to FIG. 1, potassium was coated onto urea prills which were then used as fertilizer for corn. The potassium was coated at 0%, 1% and 2% (w/w) of the prills. As can be seen, the addition of the potassium (KCl) coating made no significant difference in the growth of the corn plants.

For reference, it is noted that the actual potassium in the 1% coating shown in FIG. 1 was 0.6% whereas in the coatings of the invention discussed herein, the actual potassium level was between 0.18% to 0.24%.

Figure 3:
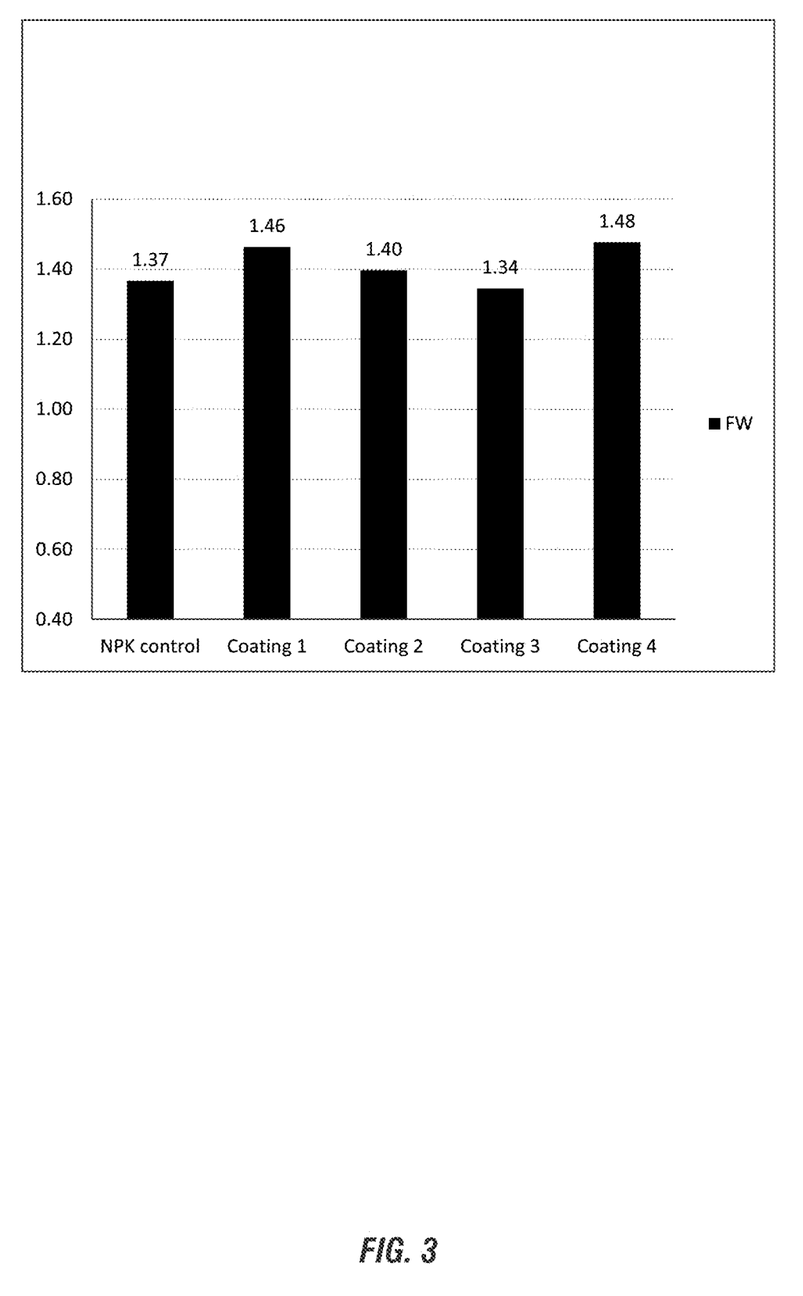
FIG. 3 is a bar graph showing the effect of each of the four coatings on fresh weight (grams) in recently emerged corn.

Referring to FIGS. 2 and 3, an NPK prill was coated with coatings 1-4 described above and corn plants were grown as described above. As can be seen in FIG. 2, all of the coatings improved growth compared to the untreated control. Coat-

| Test Coating Candidates | K % dry powder | Zn % dry powder | Mn % dry powder | Ca % dry powder | Boron % dry powder | Fe % dry powder |
|---|---|---|---|---|---|---|
| NP + Traditional K granules (Control) | 0% | 0% | 0% | 0% | 0% | 0% |
| NP + Coating#1 | 23% | 20% | 5% | 0% | 0% | 0.1% |
| NP + Coating#2 | 20.7% | 18% | 4.5% | 2.7% | 0% | 0.1% |
| NP + Coating#3 | 19.7% | 17.1% | 4.28% | 1.35% | 1.48% | 0.94% |
| NP + Coating#4 | 26% | 0% | 8.25% | 0% | 0% | 11.75% |

The benefits we obtained on two crops chosen as primary indicator crops (corn and soybeans) were, in contrast to the ings 2 and 4 produced similar root length. This indicates that under certain soil conditions, higher levels of potassium, manganese and iron can produce similar results as the addition of zinc. A comparison of coatings 1 and 2 shows that calcium also has a positive effect on growth. However, coating 3, comprising boron, had a negative impact on growth.

Referring to FIG. 3, which shows the fresh weight of the corn, the addition of boron appears to have hindered growth. Coatings 1 and 4 again showed comparable values, suggesting that different combinations of micronutrients can promote potassium uptake to similar extents.

As is well known to those of skill in the art, at an early stage in plant growth (emergence and the first week), either of two growth parameters (root growth or shoot growth) are of value. Specifically, if root growth can be enhanced, the risk of the seedling being impacted by dry conditions in the top inch of soil is decreased. If shoot growth can be increased, the photosynthetic capacity of the seedling dramatically increases and this produces faster root and shoot growth. Accordingly, as will be seen in the examples and figures, some coatings promote more root growth than shoot growth under certain conditions but both are indicative of improved growth.

Figure 4:
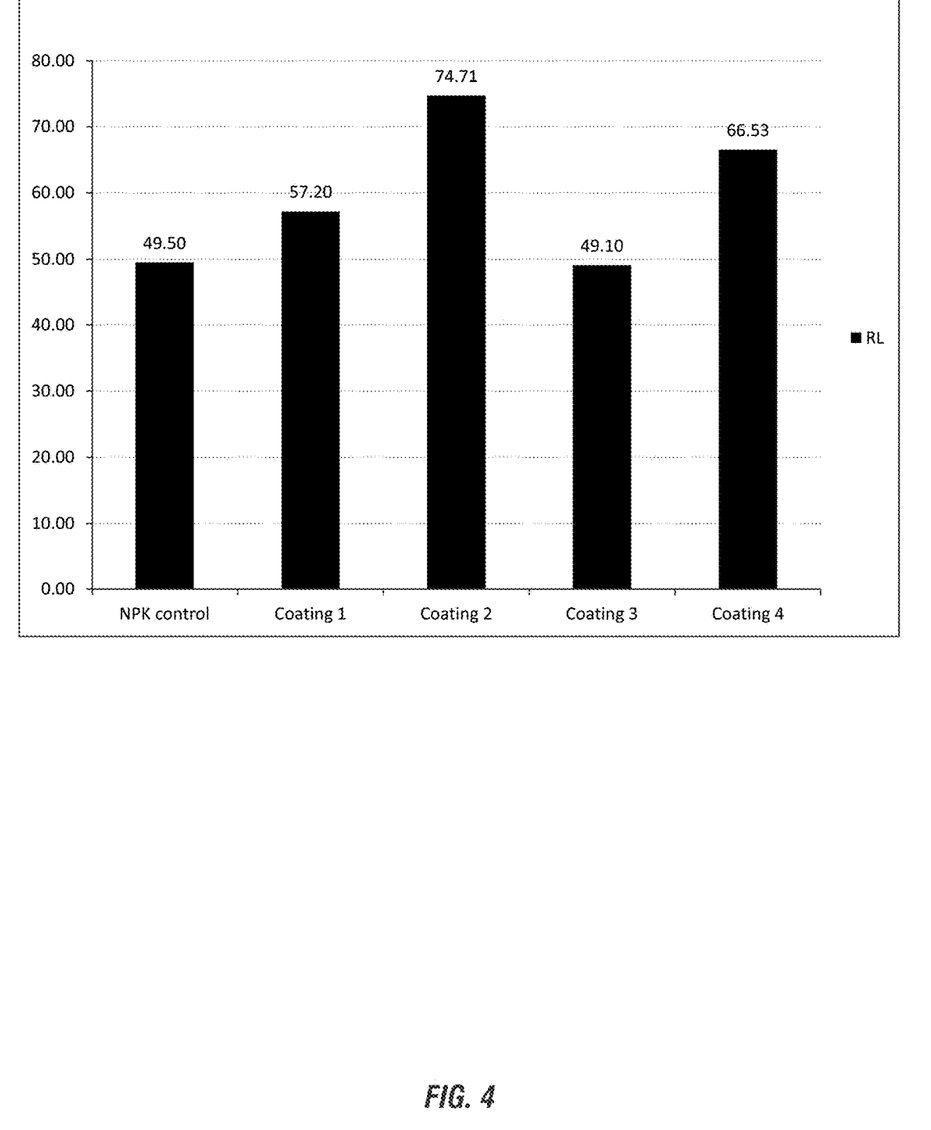
FIG. 4 is a bar graph showing the effect of each of the four coatings on root length (cm) in recently emerged corn.

Referring to FIGS. 4 and 5, corn was again harvested 10 days post-emergence. As can be seen in FIG. 4, boron again had a negative impact on root length, while the other three coatings all promoted growth. In this set of experiments, the addition of calcium had the greatest beneficial effect. In addition, adding more iron (coating 4) produced a greater benefit than zinc (coating 1).

Figure 5:
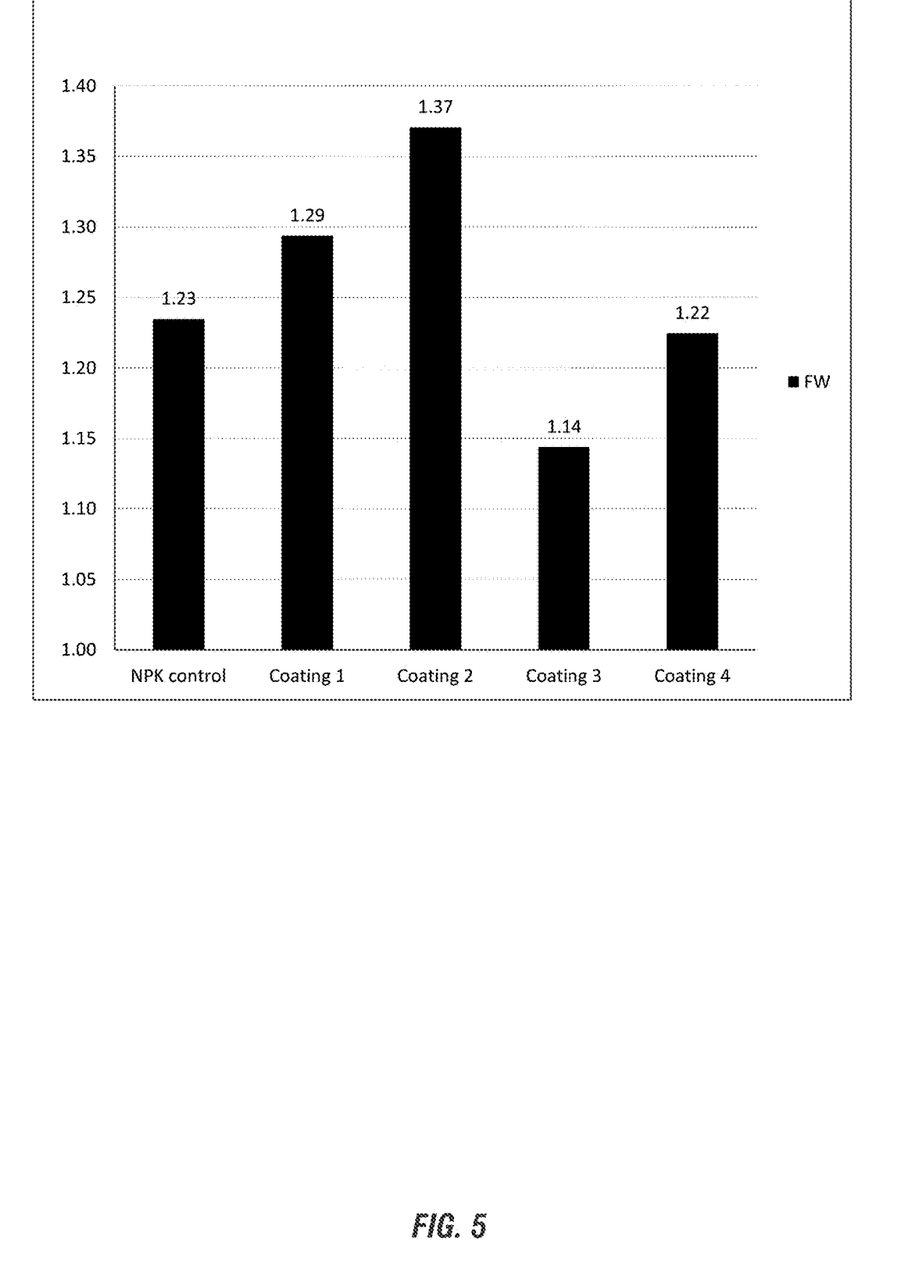
FIG. 5 is a bar graph showing the effect of each of the four coatings on fresh weight (grams) in recently emerged corn.

Referring to FIG. 5, the addition of calcium had the greatest beneficial effect on fresh weight. However, the addition of zinc (coating 1) resulted in higher fresh weight than the addition of more iron (coating 4). Boron (coating 3) had a negative effect on fresh weight.

Figure 6:
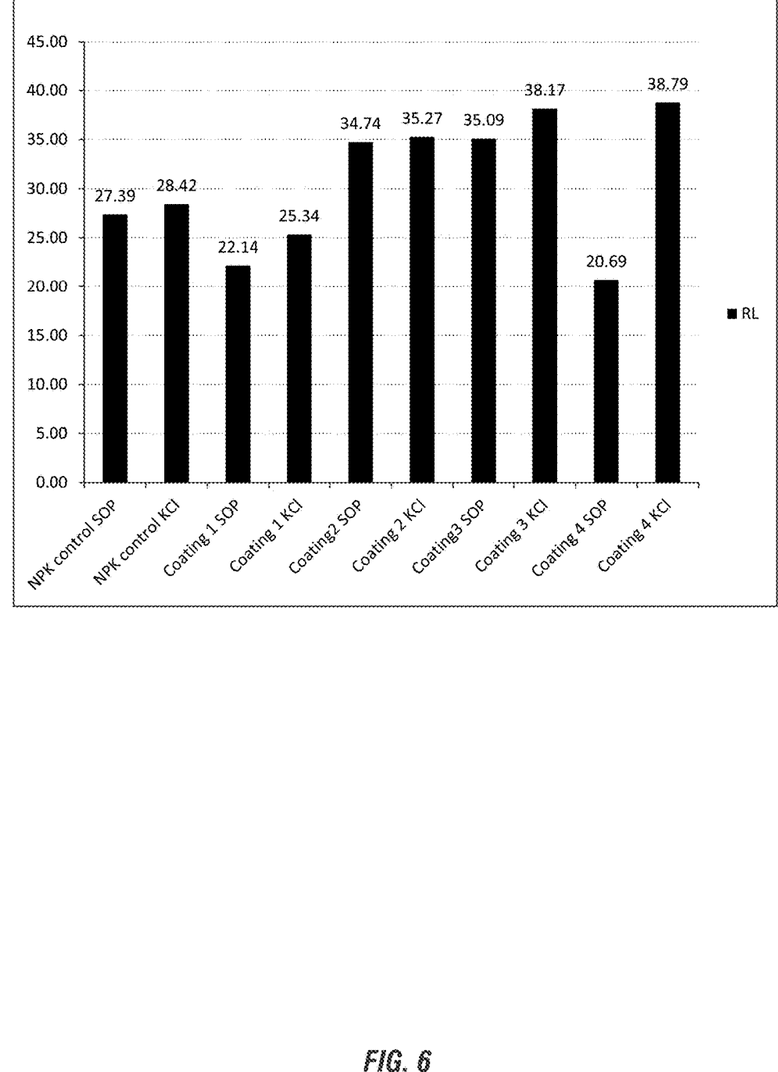
FIG. 6 is a bar graph showing the effect of varying the potassium source in each of the four coatings on root length (cm) in early seedling soybeans.
Figure 7:
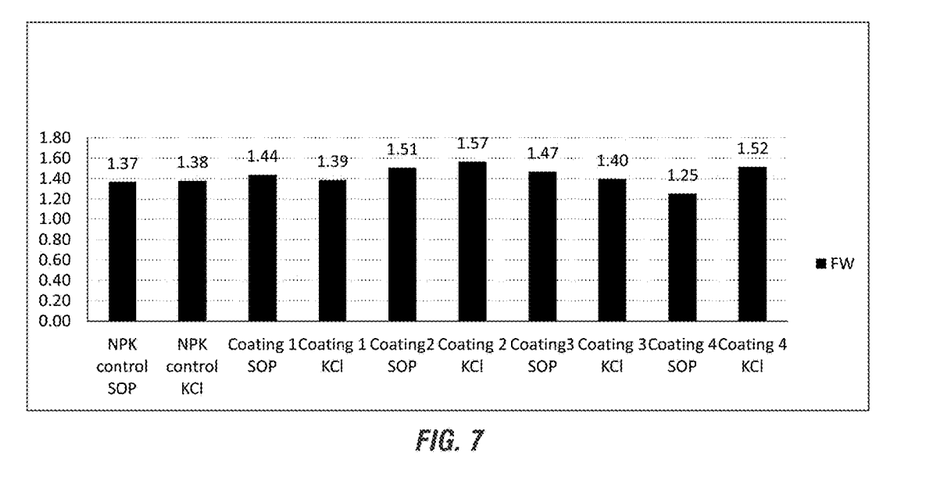
FIG. 7 is a bar graph showing the effect of varying the potassium source in each of the four coatings on fresh weight (grams) in early seedling soybeans.

Referring to FIGS. 6 and 7, the effectiveness of different sources of potassium on root length and fresh weight in soybeans was examined. Specifically, the coatings were identical except that in one set, SOP was used as the potassium source while in the other, KCl was used as the potassium source.

Referring to FIG. 6, KCl appears to be more effective at promoting root length when used in coating 4 but otherwise the coatings appear to be comparable regardless of potassium source. Boron (coating 3) did not have a negative effect on root length and in fact coating 3 is roughly comparable to coating 2.

Referring to FIG. 7, the inclusion of SOP instead of KCl as the potassium source appears to hinder growth. Coatings 2 and 3 provided the greatest increase in fresh weight, indicating that boron is beneficial to growth of soybeans.

Figure 8:
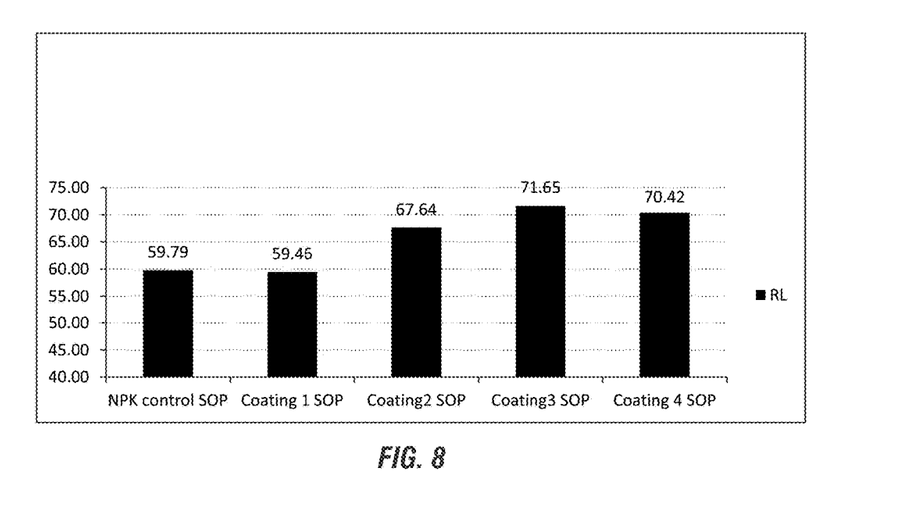
FIG. 8 is a bar graph showing the effect of each of the four coatings on root length (cm) in early seedling soybeans.
Figure 9:
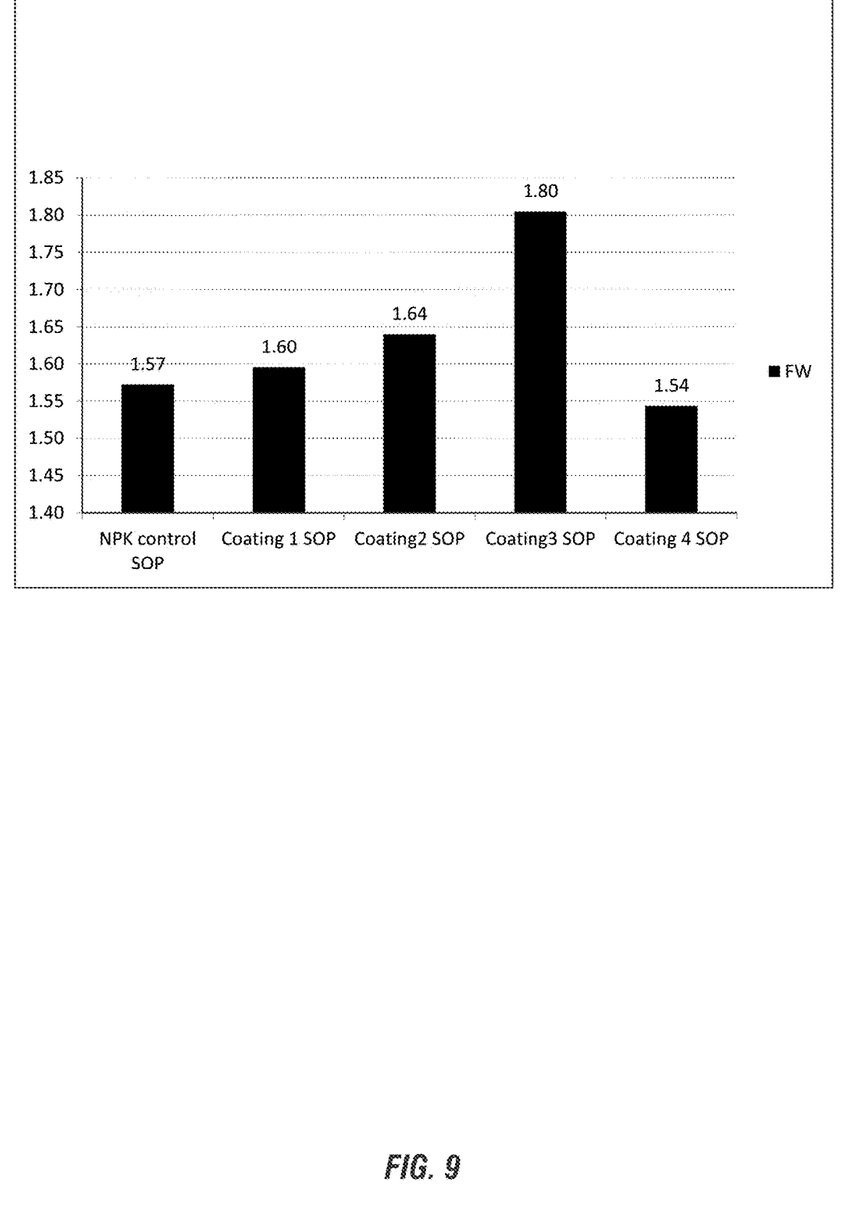
FIG. 9 is a bar graph showing the effect of each of the four coatings on early seedling fresh weight (grams) in early seedling soybeans.

Referring to FIGS. 8 and 9, the effect of the coatings on soybean growth is shown. In FIG. 8, coating 1 had approximately the same root length as the negative control. The other 3 coatings had approximately the same root length, indicating that under these conditions, boron did not inhibit root length.

In FIG. 9, the fresh weight of coating 4 was lower than the control as most of the benefit of the coating was seen in the generation of longer roots than the control. Boron (coating 3) again had a significant beneficial effect on fresh weight.

Figure 10:
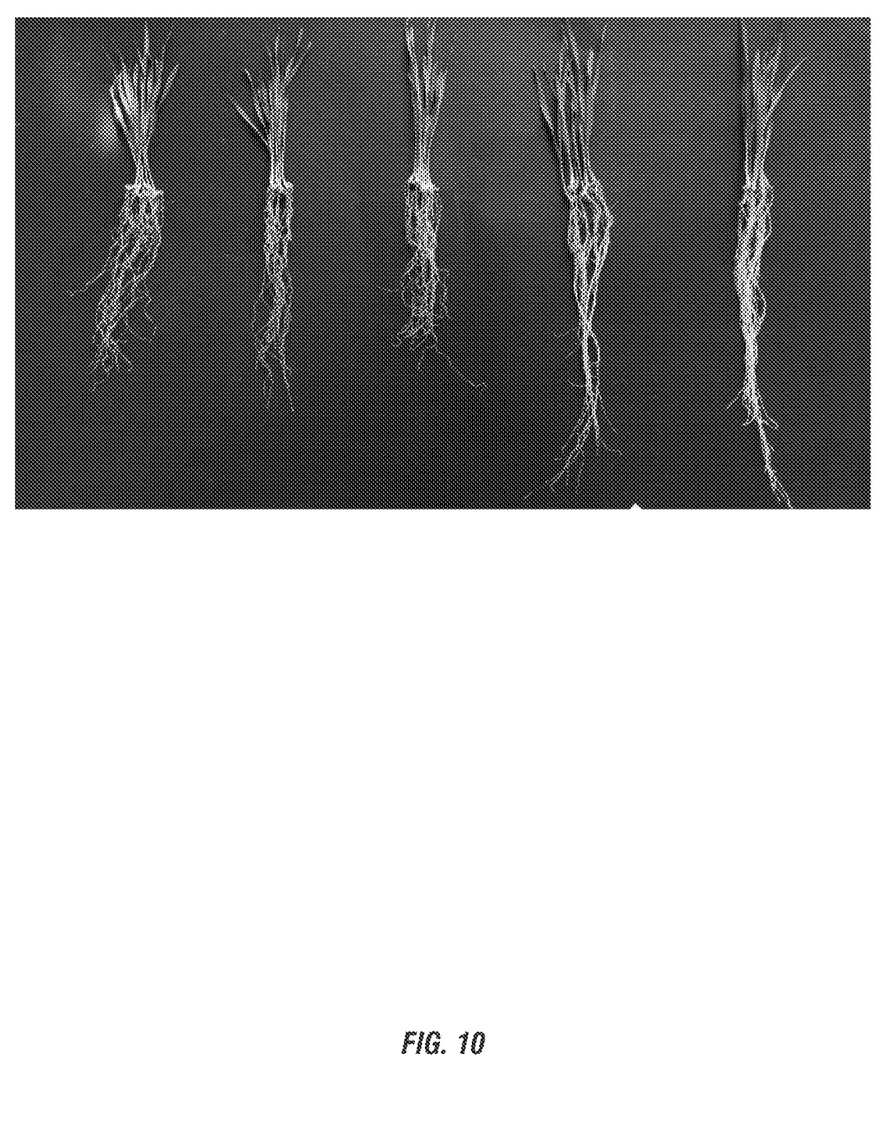
FIG. 10 is a photograph showing root growth in wheat using coatings of the invention.

In a separate experiment, wheat plants were grown for 12 days in a greenhouse in trays. The results of this experiment are shown in FIG. 10. Nitrogen and phosphate fertilizer products were administered to the soil at the time of planting.

Specifically, treatment 1 is an exemplary plant that was supplied uncoated nitrogen and phosphate fertilizer products. Treatment 2 is an exemplary plant that was supplied nitrogen, phosphate and traditional granular SOP at 50 kg per hectare. Treatment 3 is an exemplary plant that was supplied nitrogen, phosphate and potassium in the form of traditional KCl. Treatment 4 is an exemplary plant that was supplied nitrogen and phosphate fertilizer products coated with coating #2 described above wherein the potassium source was SOP. Treatment 5 is an exemplary plant that was supplied nitrogen and phosphate fertilizer products coated with coating #2 described above wherein the potassium source was KCl.

As can be seen in the photograph, the root architecture is longer and denser in the coated K treatments (treatments 4 and 5) versus the root architecture in the treatments where standard granular versions of potassium were applied. As discussed above, the combination of nutrients provided to the wheat plants using the coatings of the invention results in significantly improved root growth and with less K used.

While the preferred embodiments of the invention have been described above, it will be recognized and understood that various modifications may be made therein, and the appended claims are intended to cover all such modifications which may fall within the spirit and scope of the invention.

The invention claimed is:

1. A powder fertilizer coating comprising:
   about 30 to about 40% source of potassium (w/w);
   about 17 to about 20% source of zinc (w/w);
   about 4 to about 5% source of manganese (w/w);
   about 0.1 to about 0.9% (w/w) source of iron; and
   0 to 3% (w/w) source of calcium.

2. The coating according to claim 1 further comprising an organic acid.

3. The coating according to claim 2 wherein the organic acid is selected from the group consisting of: citrate; ascorbic acid; fulvic acid; and humic acid.

4. The coating according to claim 1 further comprising a formulating agent.

5. The coating according to claim 4 wherein the formulating agent is an alkylnaphthalene sulfonate surfactant.

6. The coating according to claim 1 wherein the source of potassium is sulphate of potash (SOP) or potassium chloride (KCl).

7. The coating according to claim 1 wherein the source of zinc is zinc sulfate ($ZnSO_4$) or Zinc oxide (ZnO).

8. The coating according to claim 1 wherein the source of manganese is manganese chloride ($MnCl_2$) or manganese sulfate ($MnSO_4$).

9. The coating according to claim 1 wherein the source of iron is iron sulfate ($FeSO_4$) or iron oxide (FeO).

10. The coating according to claim 1 wherein the source of calcium is calcium sulfate ($CaSO_4$) or calcium oxide (CaO).

11. An agronomic carrier coated with the powder fertilizer coating according to claim 1.

12. The agronomic carrier according to claim 11 wherein the agronomic carrier is selected from the group consisting of: seeds; fertilizer products; urea prills; granular fertilizer products; inert pellets; and biodegradable pellets.

13. The coating according to claim 1, wherein the powder fertilizer coating is a 325 mesh size or finer.

14. The coating according to claim 1, wherein the source of potassium is potassium chloride (KCl).

15. A method of promoting early plant growth comprising:
   providing a planted seed or seedling with a coated agronomic carrier, the coating comprising:
   about 30 to about 40% source of potassium (w/w);

about 17 to about 20% source of zinc (w/w);
about 4 to about 5% source of manganese (w/w);
about 0.1 to about 0.9% source of iron; and
0 to about 3% source of calcium; and
allowing the seed or seedling to grow under suitable growth conditions.

16. The method according to claim 15 wherein the seed or seedling shows improved early growth compared to more to a similar seed or seedling supplied an uncoated agronomic carrier.

17. The method according to claim 15 wherein the coating further comprises an organic acid.

18. The method according to claim 17 wherein the organic acid is selected from the group consisting of: citrate; ascorbic acid; fulvic acid; and humic acid.

19. The method according to claim 15 wherein the coating further comprises a formulating agent.

20. The method according to claim 19 wherein the formulating agent is an alkylnaphthalene sulfonate surfactant.

21. The method according to claim 15 wherein the source of potassium is sulphate of potash (SOP) or potassium chloride (KCl).

22. The method according to claim 15 wherein the source of zinc is zinc sulfate ($ZnSO_4$) or Zinc oxide (ZnO).

23. The method according to claim 15 wherein the source of manganese is manganese chloride ($MnCl_2$) or manganese sulfate ($MnSO_4$).

24. The method according to claim 15 wherein the source of iron is iron sulfate ($FeSO_4$) or iron oxide (FeO).

25. The method according to claim 15 wherein the source of calcium is calcium sulfate ($CaSO_4$) or calcium oxide (CaO).

26. The method according to claim 15 wherein the agronomic carrier is selected from the group consisting of: seeds; fertilizer products; urea prills; granular fertilizer products; inert pellets; and biodegradable pellets.

27. A method of promoting early plant growth comprising:
providing a seed coated with a coating comprising:
about 30 to about 40% source of potassium (w/w);
about 17 to about 20% source of zinc (w/w);
about 4 to about 5% source of manganese (w/w);
about 0.1 to about 0.9% source of iron; and
0 to about 3% source of calcium; and
allowing the seed to grow under suitable growth conditions.

28. The method according to claim 27 wherein the seed or seedling shows improved early growth compared to more to a similar seed or seedling supplied an uncoated agronomic carrier.

29. The method according to claim 27 wherein the coating further comprises an organic acid.

30. The method according to claim 29 wherein the organic acid is selected from the group consisting of: citrate; ascorbic acid; fulvic acid; and humic acid.

31. The method according to claim 27 wherein the coating further comprises a formulating agent.

32. The method according to claim 31 wherein the formulating agent is an alkylnaphthalene sulfonate surfactant.

33. The method according to claim 27 wherein the source of potassium is sulphate of potash (SOP) or potassium chloride (KCl).

34. The method according to claim 27 wherein the source of zinc is zinc sulfate ($ZnSO_4$) or Zinc oxide (ZnO).

35. The method according to claim 27 wherein the source of manganese is manganese chloride ($MnCl_2$) or manganese sulfate ($MnSO_4$).

36. The method according to claim 27 wherein the source of iron is iron sulfate ($FeSO_4$) or iron oxide (FeO).

37. The method according to claim 27 wherein the source of calcium is calcium sulfate ($CaSO_4$) or calcium oxide (CaO).

38. A powder fertilizer coating comprising:
at least about 36% source of potassium (w/w);
about 17 to about 20% source of zinc (w/w);
about 4 to about 5% source of manganese (w/w);
about 0.1 to about 0.9% (w/w) source of iron; and
0 to 3% (w/w) source of calcium.

39. The coating according to claim 38 further comprising an organic acid.

40. The coating according to claim 39 wherein the organic acid is selected from the group consisting of: citrate; ascorbic acid; fulvic acid; and humic acid.

41. The coating according to claim 38 further comprising a formulating agent.

42. The coating according to claim 41 wherein the foiiuulating agent is an alkylnaphthalene sulfonate surfactant.

43. The coating according to claim 38 wherein the source of potassium is sulphate of potash (SOP) or potassium chloride (KCl).

44. The coating according to claim 38 wherein the source of zinc is zinc sulfate ($ZnSO_4$) or Zinc oxide (ZnO).

45. The coating according to claim 38 wherein the source of manganese is manganese chloride ($MnCl_2$) or manganese sulfate ($MnSO_4$).

46. The coating according to claim 38 wherein the source of iron is iron sulfate ($FeSO_4$) or iron oxide (FeO).

47. The coating according to claim 38 wherein the source of calcium is calcium sulfate ($CaSO_4$) or calcium oxide (CaO).

48. An agronomic carrier coated with the powder fertilizer coating according to claim 38.

49. The agronomic carrier according to claim 48 wherein the agronomic carrier is selected from the group consisting of: seeds; fertilizer products; urea prills; granular fertilizer products; inert pellets; and biodegradable pellets.

50. The coating according to claim 38, wherein the powder fertilizer coating is a 325 mesh size or finer.

51. The coating according to claim 38, wherein the source of potassium is potassium chloride (KCl).

* * * * *